(12) United States Patent
Ye et al.

(10) Patent No.: US 9,718,474 B2
(45) Date of Patent: Aug. 1, 2017

(54) QUICK MINI-SPARE DETECTION

(71) Applicant: Continental Automotive Systems, Inc., Auburn Hills, MI (US)

(72) Inventors: Bo Ye, Rochester Hills, MI (US); Michael Gerhard Schneider, Troy, MI (US); Sai-Pavan Eswara, Auburn Hills, MI (US); Matthew Conrad Tuhro, Sault Ste. Marie, MI (US); Vesa Luomaranta, Aweres Township (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 42 days.

(21) Appl. No.: 14/835,907

(22) Filed: Aug. 26, 2015

(65) Prior Publication Data

US 2016/0059859 A1    Mar. 3, 2016

Related U.S. Application Data

(60) Provisional application No. 62/041,817, filed on Aug. 26, 2014.

(51) Int. Cl.
| B60T 7/12 | (2006.01) |
| G05D 1/00 | (2006.01) |
| G06F 7/00 | (2006.01) |
| G06F 17/00 | (2006.01) |
| B60W 30/18 | (2012.01) |
| B60T 8/175 | (2006.01) |
| B60T 8/1755 | (2006.01) |

(52) U.S. Cl.
CPC ....... *B60W 30/18172* (2013.01); *B60T 8/175* (2013.01); *B60T 8/17551* (2013.01); *B60T 2240/07* (2013.01); *B60W 2520/26* (2013.01); *B60W 2520/28* (2013.01)

(58) Field of Classification Search
CPC .. B60T 2240/07; B60T 8/175; B60T 8/17551; B60W 2520/26; B60W 2520/28; B60W 30/18172
USPC .......................................................... 701/75
See application file for complete search history.

(56) References Cited

U.S. PATENT DOCUMENTS

| 5,415,468 A | * | 5/1995 | Latarnik | B60T 8/175 180/197 |
| 5,492,192 A | * | 2/1996 | Brooks | B60K 28/16 180/165 |
| 5,748,474 A | * | 5/1998 | Masuda | B60K 23/04 180/197 |
| 5,760,682 A | * | 6/1998 | Liu | B60C 23/061 340/442 |
| 5,884,207 A | * | 3/1999 | Burkhard | B60T 8/17616 180/197 |
| 5,929,329 A | * | 7/1999 | Burkhard | B60T 8/172 73/1.37 |

(Continued)

*Primary Examiner* — Harry Oh

(57) ABSTRACT

A vehicle stability control system operates by detecting a wheel speed potentially indicative of the presence of a mini-spare wheel at a wheel location of a vehicle with a wheel speed sensor and determines that a mini-spare tire is present responsive to the wheel speed remaining within a predefined band for predefined time. A threshold value that triggers action by a vehicle stability control system is adjusted to provide the mini-spare wheel with a value different than a wheel speed threshold value indicative of wheel slipping for a standard wheel.

11 Claims, 3 Drawing Sheets

(56) References Cited

U.S. PATENT DOCUMENTS

| | | | | |
|---|---|---|---|---|
| 5,979,584 A | * | 11/1999 | Glab | B60K 17/35 |
| | | | | 137/512.1 |
| 5,995,897 A | * | 11/1999 | Oshiro | B60T 8/172 |
| | | | | 303/169 |
| 6,047,231 A | * | 4/2000 | Rodrigues | B60K 23/0808 |
| | | | | 180/197 |
| 6,470,254 B1 | * | 10/2002 | Schmitt | B60T 8/173 |
| | | | | 180/170 |
| 2006/0255924 A1 | * | 11/2006 | Ray | B60C 23/061 |
| | | | | 340/444 |
| 2009/0326733 A1 | * | 12/2009 | Abele | B60T 8/172 |
| | | | | 701/1 |

* cited by examiner

QUICK MINI-SPARE DETECTION

CROSS REFERENCE TO RELATED APPLICATION

This application claims priority to U.S. Provisional Application No. 62/041,817 filed Aug. 26, 2014.

BACKGROUND

This disclosure relates to an automotive vehicle traction control system and electronic stability control systems. Such systems utilize information relating to vehicle conditions to maintain stability and wheel traction. Such systems may actuate a brake system or modify engine operation to maintain desired vehicle stability. The information provided to the vehicle comes from various sources and the system relies on the accuracy of information provided.

Vehicles often include a mini-spare tire instead of a full size (spare) tire. The use of the mini-spare is desirable as it saves both cost and weight. However, the different size of the mini-spare changes how a vehicle operates and thereby can diminish the accuracy of information relied on by traction control and stability control systems.

SUMMARY

In one disclosed embodiment, a method of operating a vehicle control system includes the steps of detecting a wheel speed potentially indicative of the presence of a mini-spare wheel at a wheel location of a vehicle with a wheel speed sensor. The method further includes determining that a mini-spare tire is present responsive to the wheel speed remaining within a predefined band for predefined time. A threshold value that triggers action by a vehicle stability control system is temporarily adjusted to compensate for the increased speed of the mini-spare wheel until wheel speed values for that wheel can be compensated for such that the threshold value may be returned to the original threshold value indicative of wheel slipping for a standard wheel.

In another disclosed embodiment, a traction control system includes a controller configured to receive signals for detecting a wheel speed indicative of the presence of a mini-spare wheel and increasing a threshold value that triggers an intervention response to wheel slipping. The controller is configured to determine that a mini-spare wheel is present responsive to the wheel speed remaining within a predefined band for predefined time, and to generate an output for adjusting the threshold value for the wheel determined to include the mini-spare.

These and other features of the disclosed examples can be understood from the following description and the accompanying drawings, which can be briefly described as follows.

DETAILED DESCRIPTION

Figure 1:
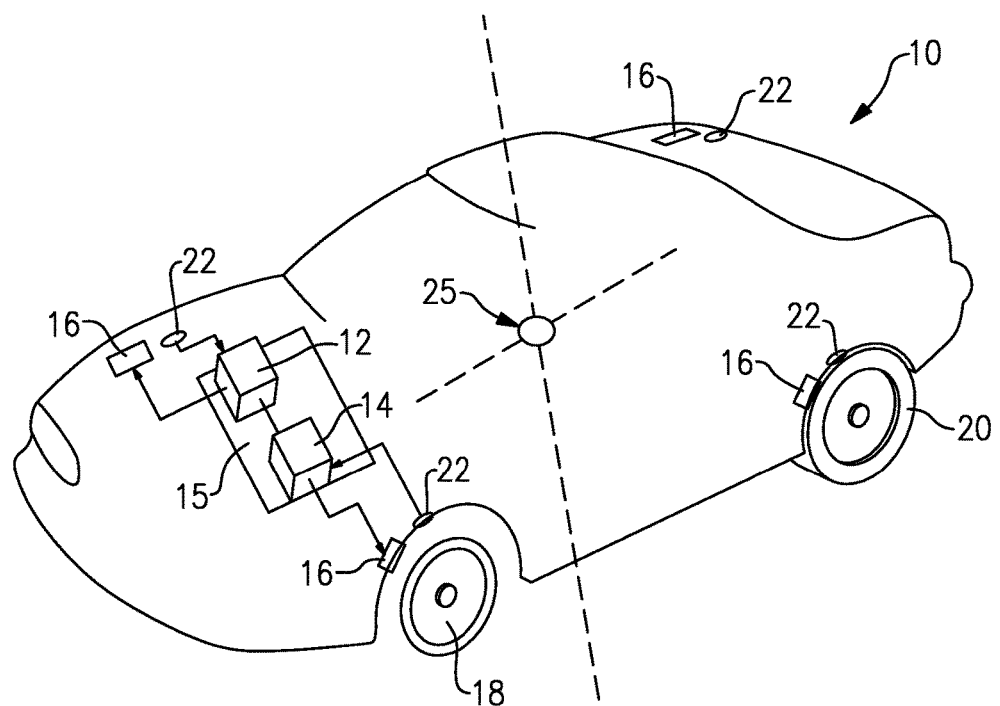
FIG. 1 is a schematic view of an exemplary vehicle including Electronic Stability Control and a Traction Control System with a mini-spare wheel installed.

Referring to FIG. 1, a vehicle 10 is shown schematically and includes a Traction Control System (TCS) 12 and an Electronic Stability Control system (ESC) 14. The TCS 12 and ESC 14 receive information regarding vehicle operation and use that information to initiate actions to provide desired vehicle operation. In this example, the TCS 12 and ESC 14 are part of a vehicle controller 15 configured to receive signals and generate commands for controlling vehicle systems such as brakes 16. The controller 15 can be part of a vehicle controller, or part of sub system that operates in concert with the vehicle controller.

In one disclosed embodiment, the TCS 12 utilizes wheel speed sensors 22 to detect slipping of one of the vehicle wheels. Wheel slip is indicated when one of the wheels is rotating faster than the other wheels, or faster than expected for vehicle operation. The TCS 12 and ESC 14 may then initiate actuation of a brake 16 at the slipping wheel to slow that wheel and regain traction.

In response to a flat tire experienced on the roadway, a temporary spare tire is typically installed in place of the standard vehicle tire. In many instances, the spare is a mini-spare 18, meaning that the diameter and width is much smaller than the standard tire 20 (normally 5%~20% smaller than the standard tire). The smaller diameter of the mini-spare 18 results in that tire rotating at an increased wheel speed compared to the standard tire 20 at a common vehicle speed. The increased wheel speed of the mini-spare 18 may be improperly identified by the TCS 12 and ESC 14 as wheel slipping. Accordingly, the TCS 12 and ESC 14 may intervene by actuating the brake 16 for that wheel until the system recognizes or learns that a mini-spare 18 has been installed. Once the existence of the mini-spare 18 is established, compensation is made for the increased wheel speed such that the system may return to normal threshold values. The system compensates for the increased wheel speeds and the threshold value can therefore be returned to the original threshold value.

The lag in time that is required for the vehicle controller 15 to recognize the presence of a mini-spare 18 can be undesirably long and result in undesired intervention of the TCS 12 to slow the vehicle. During the recognition process, the mini-spare wheel 18 introduces artificial wheel slips due to the increased wheel speeds, and may cause intervention by the TCS 12 as a brake actuation and/or engine torque reduction. Undesired intervention may lead to very poor vehicle acceleration, especially for vehicles with a very small mini-spare.

The example method and system supplements the current system and enables faster recognition of the mini-spare 18 without undesired intervention by the TCS 12 or the ESC 14. Once the presence of a mini-spare 18 is recognized, the TCS 12 and ESC 14 thresholds are temporarily adjusted to compensate for the increased wheel speeds to reduce and prevent false TCS intervention caused by false wheel slip indications. Once the existence of the wheel speeds is recognized, a compensation value is applied to wheel velocity readings from that wheel. The threshold value may then be returned to the original threshold value.

Figure 2:
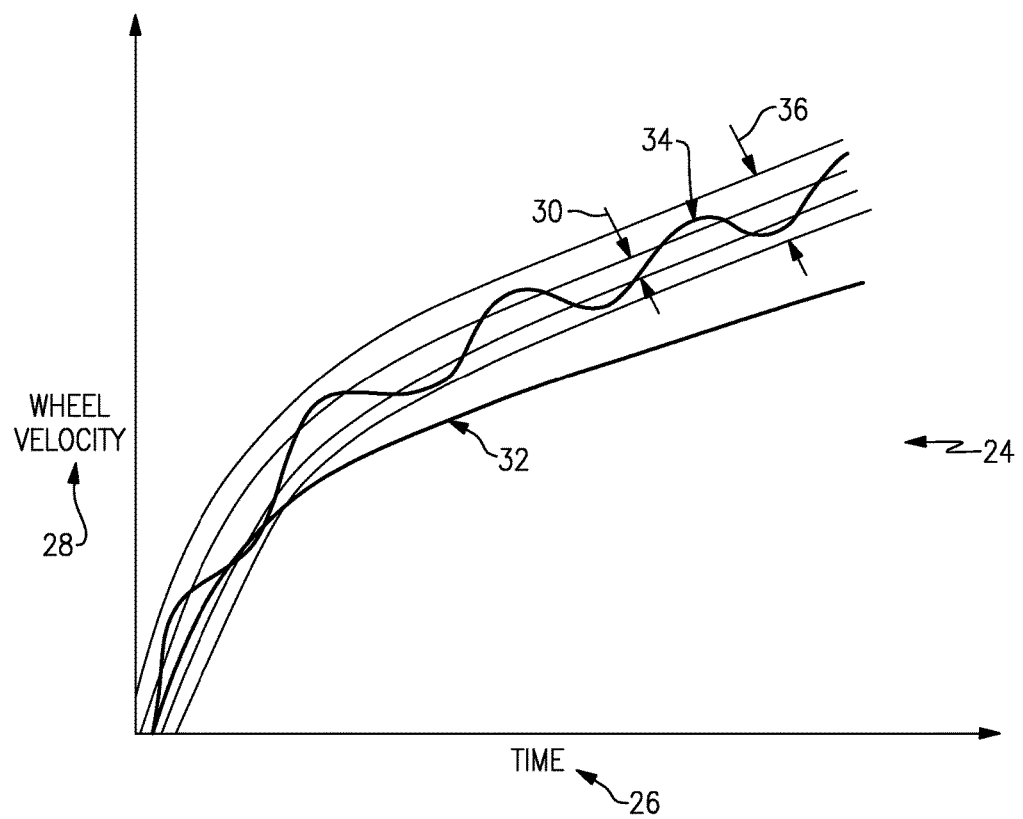
FIG. 2 is a schematic view of a signal utilized for determining the presence of a mini-spare wheel.

Referring to FIG. 2, a graph 24 relates time 26 to wheel velocity 28. A band 30 is illustrated that represents the dynamics of the wheel velocity recognized as mini-spare wheel speed to remove disturbance influence from wheel speeds, i.e., avoid false detection of mini-spare caused by a split surface or speed bump. The band 30 represents the range of wheel velocities that is recognized as a mini-spare. As is shown, the band 30 is narrow to prevent incorrect categorization of slipping of a normal wheel as a mini-spare. However, the band 30 also requires more time to confirm the presence of a mini-spare.

Line 32 represents wheel velocity for a normal tire over the same time as that of the mini-spare represented by line 34. A period of time is required to confirm that the faster wheel speeds are due to the installation of the mini-spare 18. The disclosed wheel velocities represented by the line 34 and the line 32 are determined utilizing a corrected wheel velocity. The corrected wheel velocity refers to a speed of the wheels based on a speed of the vehicle determined at a center of the vehicle 25 (Shown schematically in FIG. 1). Velocity at the center of the vehicle 25 is utilized to eliminate differences between wheels and to generate a quicker indication of differences in wheel velocities that are indicative of the presence of a mini-spare. The corrected wheel velocity also eliminates the influence of wheel velocity difference for the curve inside and outside wheels when the vehicle is driving on a curve.

Accordingly, if the vehicle is driving stable (even on a curve), all four wheel velocities should have very close values. In order to identify a mini-spare within band 30, the learning process is very robust, but slow. Accordingly, sometimes a vehicle might have already slowed down due to intervention by the TCS 12 and/or ESC 14 caused by false wheel slip from mini-spare wheel during this learning process. In order to avoid false TCS and/or ESC 14 intervention during this learning process, a second band 36 is provided for quicker mini-spare identification. If one wheel velocity is quicker than the others and the difference between them is within a mini-spare range of wheel velocities indicated by the second band 36, the TCS 12 and ESC 14 will switch to the new monitoring of the mini-spare. If the wheel velocity is within the band 36 for a predefined time, for example, one second, then a temporary threshold for the mini-spare is recognized. In one disclosed example, the range is nominally 5~20% of the sensed wheel velocity. In another example, the band 36 maybe from 8-10% greater than the normal wheel velocity. It should be understood that the range of wheel velocity is dependent on the size of the mini-spare and that other ranges are within the contemplation of this disclosure depending on the size of the mini-spare compared to the normal wheel. Therefore, if the actual measured wheel velocity for the mini-spare 18 as is indicated by line 34 falls within the range of the band 30, the controller 15 will recognize the presence of the mini-spare 18.

The broader range 36 is utilized to provide a temporary detection and recognition of the mini-spare 18. If the wheel velocity 34 of the mini-spare falls within the second larger band 36, the system temporarily recognizes the presence of a mini-spare 18. The temporary recognition provides additional time for recognition without interference from the TCS 12 and the ESC 14. In response to the recognition of the presence of the mini-spared 18, the dynamics for the TCS 12 and ESC 14 are altered for the mini-spare 18.

If after a defined monitoring time, the dynamics of the difference is within a defined window during the whole period, a possible mini-spare wheel can be identified. If the dynamics of the difference is outside the defined window or the difference falls below a nominal mini-spare range by a defined amount, the learning functions are reset.

Figure 3:
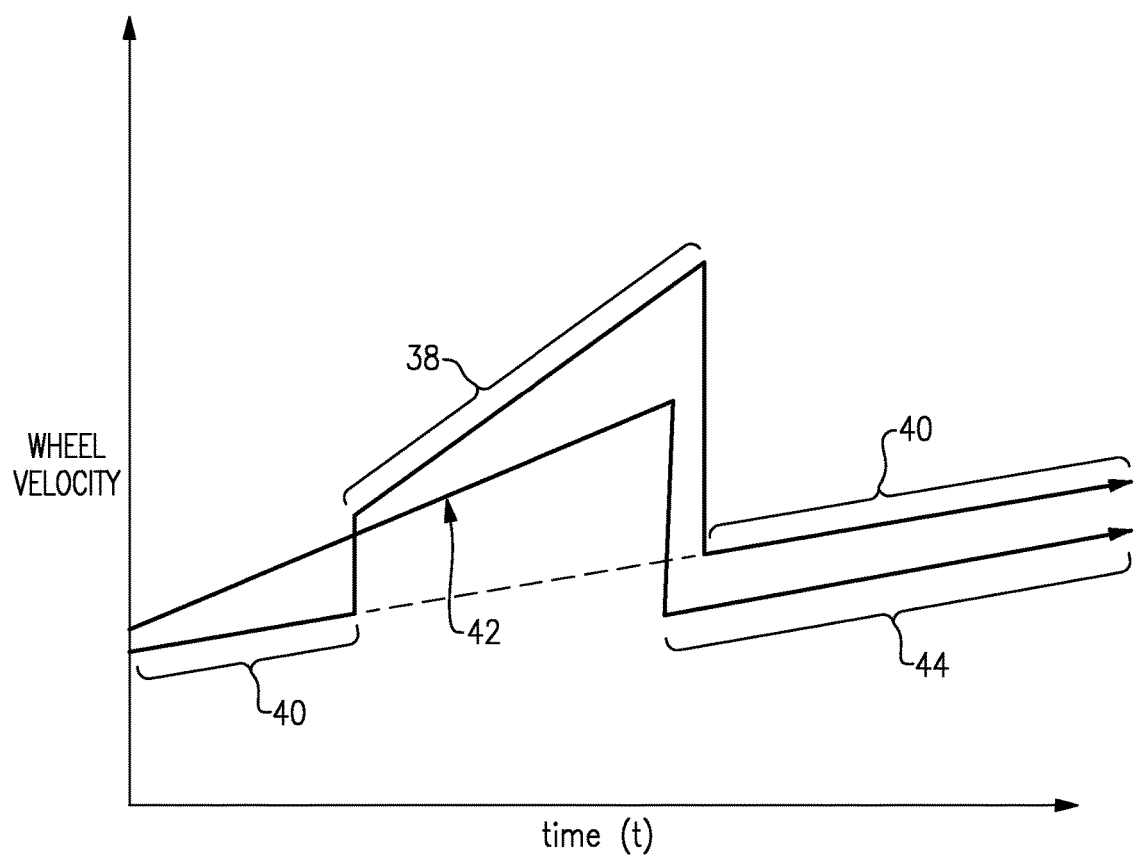
FIG. 3 is a schematic representation of a threshold value adjusted for a mini-spare wheel.

Referring to FIG. 3, an initial threshold value 40 is illustrated that indicates when the TCS 12 and ESC 14 would take corrective action. Wheel speed velocities that exceed the initial threshold 40 would indicate wheel slipping in standard and normal sized wheels for the vehicle. However, because wheel speed velocity of the mini-spare 18 indicated by line 42 exceeds the initial threshold value 40, the disclosed method and system adjusts the threshold 40 to a new adjusted threshold value as is indicated at 38. The threshold value 38 is therefore adjusted to a value that is indicative of wheel slip for the mini-spare 18. In addition, the speed may be adjusted for the axle including the mini-spare 18 wheel.

The increase in the threshold 38 value avoids intervention by the TCS 12 and or ECS 14 so that the vehicle can achieve desired acceleration and performance. Once the standard mini-spare learning process is finished, wheel speeds will be compensated with the mini-spare difference reflected. The compensations made upon recognition of the mini-spare wheel 18 results in a wheel velocity signal that is reduced and within limits similar to those for a normal wheel. In the illustrated example, the wheel velocity of the mini-spare 18 is compensated for as shown by portion 44. The line portion 44 is reduced and within the threshold limits provided by the original threshold value indicated at 40. The threshold value 40 is therefore returned and operates to detect wheel velocities within the original limitations.

The disclosed process of recognizing and adapting to the presence of a standard mini-spare is operable during operation of the vehicle at higher speeds. In one disclosed embodiment the method and process is configured to provide the desired threshold modification at speeds in excess of 50 mph (80 kph). The disclosed system uses corrected wheel velocities to enable learning even when vehicle starts on a curve such as for example a high way entrance ramp.

The disclosed method and system may be implemented as part of software programmed to operate the controller 15 configured to receive signals and generate comments to actuate various vehicle systems. The controller 15 may be configured to perform the method steps of detecting differences in vehicle wheel speed, determining that wheel speed exists and evaluating whether a mini-spare is present. The controller 15 may also be configured to adjust threshold values based on the initial indication and determination that the mini-spare 18 is installed on the vehicle.

The disclosed system and method enables quicker reaction and learning by the ESC system so that unnecessary TCS intervention can be avoided and desirable vehicle acceleration can be achieved once the mini-spare is installed. It is within the contemplation of this disclosure to apply the temporary threshold increases for use with other vehicle systems that may utilize wheel velocities. Moreover, the method and system of this disclosure could be part of other software utilized in other vehicle systems that receive information indicative of wheel speed.

Although an example embodiment has been disclosed, a worker of ordinary skill in this art would recognize that certain modifications would come within the scope of the claims. For that reason, the following claims should be studied to determine their true scope and content.

What is claimed is:

1. A method of operating a vehicle control system comprising:
    detecting a wheel velocity indicative of a presence of a mini-spare wheel at a wheel location of a vehicle with a wheel speed sensor;
    determining a corrected wheel velocity for all wheels of the vehicle based on a velocity at a center of the vehicle;
    defining a range of corrected wheel velocities recognized for a mini-spare wheel;
    determining that a mini-spare tire is present responsive to the corrected wheel velocity remaining within the defined range of corrected wheel velocities recognized for a mini-spare wheel for a predefined time, wherein the range of corrected wheel velocities recognized for a mini-spare is greater than a corrected wheel velocity for a standard wheel installed within the vehicle;

adjusting a wheel velocity threshold value utilized to identify a wheel slipping for the wheel location determined to include the mini-spare wheel to a value different than an original wheel velocity threshold value indicative of wheel slipping for a standard wheel, receiving signals indicative of wheel velocity from the wheel speed sensors with a controller, the controller configured to initiate actuation of components of a braking system responsive to a determination that wheel slip has occurred; and actuating a brake associated with a wheel location associated with the wheel slipping determined by the controller.

2. The method as recited in claim 1, wherein adjusting the wheel velocity threshold value includes increasing the wheel velocity threshold value in response to the detection of the wheel velocity indicative of the presence of a mini-spare wheel.

3. The method as recited in claim 2, including compensating for the wheel velocity of the mini-spare wheel and returning the wheel velocity threshold value to the original threshold value after compensating for the increased wheel velocity of the mini-spare.

4. The method as recited in claim 1, wherein determining that a mini-spare wheel is present comprises monitoring a curve corrected wheel velocity for each wheel of the vehicle.

5. The method as recited in claim 4, wherein detecting a wheel velocity indicative of a mini-spare wheel comprises detecting that one of the vehicle wheels is rotating at a velocity greater than at any other wheel on the vehicle.

6. The method as recited in claim 1, including confirming that the mini-spare wheel is present based on the wheel velocity of the mini-spare wheel remaining within the range of wheel velocities greater than the wheel velocity for a standard wheel installed in the vehicle for a predefined time.

7. The method as recited in claim 6, wherein the predefined velocity range is within a range that is nominally +/−3% of a wheel velocity detected by the wheel speed sensor.

8. The method as recited in claim 6, including determining that a mini-spare wheel is not present at a specific wheel location responsive to wheel velocity falling below a nominal expected wheel speed for the mini-spare wheel prior to expiration of the predefined time.

9. A traction control system comprising:

a controller configured to receive signals for detecting a wheel velocity indicative of the presence of a mini-spare wheel and increase a wheel velocity threshold value that triggers an intervention response to wheel slipping, wherein the controller is further configured to determine a corrected wheel velocity based on a speed determined at a center of the vehicle; and a wheel speed sensor for detecting a wheel velocity and communicating information to the controller indicative of a wheel velocity at each wheel location on the vehicle, wherein the controller is configured to determine the corrected wheel velocity for each wheel and initiate actuation of a braking system responsive to a determination that wheel slip has occurred, and wherein the controller is configured to determine that a mini-spare wheel is present responsive to the corrected wheel velocity remaining within a range of corrected wheel velocities for a predefined time, wherein the range of wheel velocities is greater than a wheel speed velocity of a standard wheel installed on the vehicle, and to temporally adjust the wheel velocity threshold value for the wheel determined to include the mini-spare.

10. The traction control system as recited in claim 9, wherein the controller is configured to determine that a mini-spare wheel is present by monitoring a curve corrected wheel velocity for each wheel of the vehicle and determine that a mini-spare wheel is present responsive to the wheel velocity at a wheel location being greater than wheel velocities at other wheel locations on the vehicle.

11. The traction control system as recited in claim 9, wherein the predefined band of wheel speed indicative of a mini-spare wheel is nominally +/−3% of the sensed wheel velocity.

* * * * *